United States Patent
Cesani et al.

(10) Patent No.: US 9,388,870 B2
(45) Date of Patent: Jul. 12, 2016

(54) DEVICE FOR RETRACTING A PISTON

(71) Applicant: FRENI BREMBO, S.p.A., Bergamo (IT)

(72) Inventors: Paolo Cesani, Bergamo (IT); Cristian Crippa, Bergamo (IT)

(73) Assignee: FRENI BREMBO, S.P.A., Curno (IT)

( * ) Notice: Subject to any disclaimer, the term of this patent is extended or adjusted under 35 U.S.C. 154(b) by 0 days.

(21) Appl. No.: 14/347,579

(22) PCT Filed: Sep. 25, 2012

(86) PCT No.: PCT/IB2012/055102
§ 371 (c)(1),
(2) Date: Mar. 26, 2014

(87) PCT Pub. No.: WO2013/046122
PCT Pub. Date: Apr. 4, 2013

(65) Prior Publication Data
US 2014/0231190 A1 Aug. 21, 2014

(30) Foreign Application Priority Data

Sep. 27, 2011 (IT) .............................. MI2011A1739

(51) Int. Cl.
*F16D 55/22* (2006.01)
*F16D 65/16* (2006.01)
*F16D 65/18* (2006.01)
*F16D 121/02* (2012.01)
*F16D 127/02* (2012.01)

(52) U.S. Cl.
CPC ................ *F16D 65/16* (2013.01); *F16D 65/18* (2013.01); *F16D 2121/02* (2013.01); *F16D 2127/02* (2013.01)

(58) Field of Classification Search
CPC ..... F16D 65/18; F16D 65/16; F16D 2121/02; F16D 2127/02
USPC .................. 188/72.3, 72.4, 370, 216, 322.18; 277/553, 311, 589, 300
See application file for complete search history.

(56) References Cited

U.S. PATENT DOCUMENTS

| 2,520,306 | A | * | 8/1950 | Detweiler | 277/448 |
| 4,058,084 | A |   | 11/1977 | Kawaguchi et al. | |
| 4,229,013 | A |   | 10/1980 | Burke et al. | |
| 4,674,754 | A | * | 6/1987 | Lair et al. | 277/311 |

(Continued)

FOREIGN PATENT DOCUMENTS

| JP | 05133429 A | * | 5/1993 |
| JP | 2009008105 A | * | 1/2009 |
| WO | 2010064265 A1 |   | 6/2010 |

*Primary Examiner* — Thomas J Williams
*Assistant Examiner* — Mariano Sy
(74) *Attorney, Agent, or Firm* — Thomas Horstemeyer, LLP

(57) ABSTRACT

A device for retracting a piston for a brake caliper is disclosed. The device is suitable for actuating at least one pad for brake calipers of the type comprising a body arranged astride of a brake disc having a rotation axis and two opposite friction surfaces perpendicular to the rotation axis. The piston is suitable for axially translating, thus bringing each pad in contact with force against a respective friction surface of the disc, generating a braking friction torque that is opposite to the rotation direction of the disc. The piston is slidably actuated within a respective seat formed in the caliper body, biased by the pressure of a brake fluid supplied by a supplying plant, in a manner that is controlled by a user to carry out a braking action.

14 Claims, 10 Drawing Sheets

(56) References Cited

U.S. PATENT DOCUMENTS 4,729,569 A * 3/1988 Muller et al. .................. 277/584
5,143,382 A * 9/1992 Maringer ...................... 277/584
6,173,968 B1 * 1/2001 Nelson et al. .................. 277/619
8,376,101 B2 * 2/2013 Crippa et al. .................. 188/370
8,474,829 B2 * 7/2013 Otsuka et al. .................. 277/584

* cited by examiner

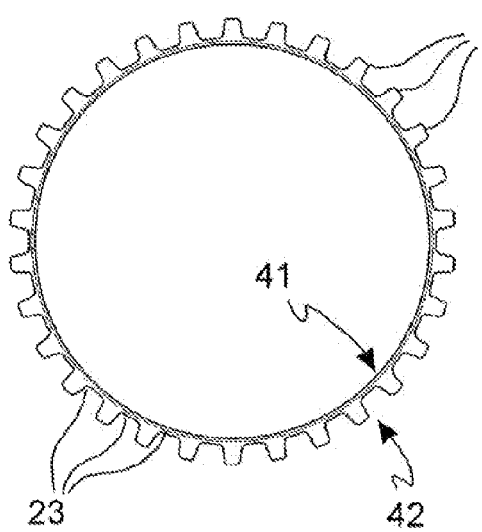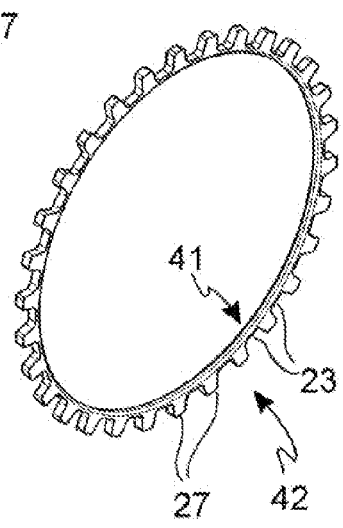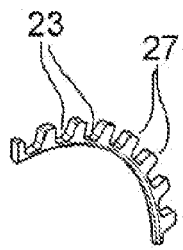
FIG. 11a  FIG. 11b  FIG. 11c
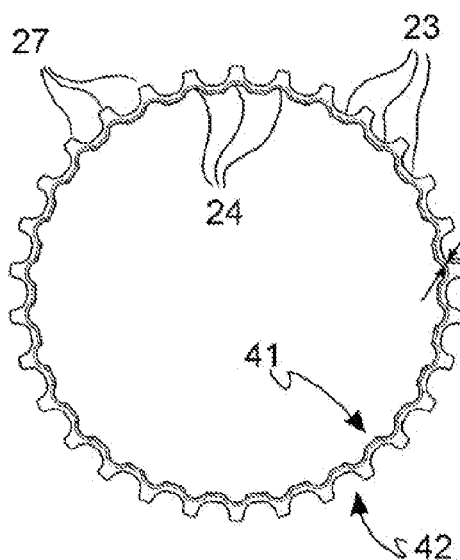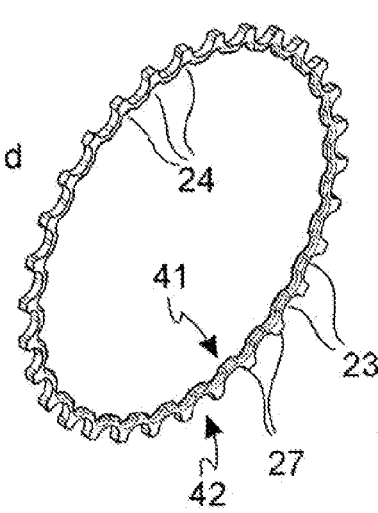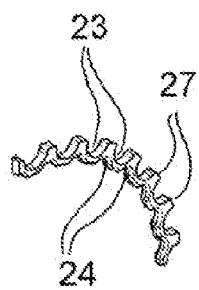
FIG. 12a  FIG. 12b  FIG. 12c

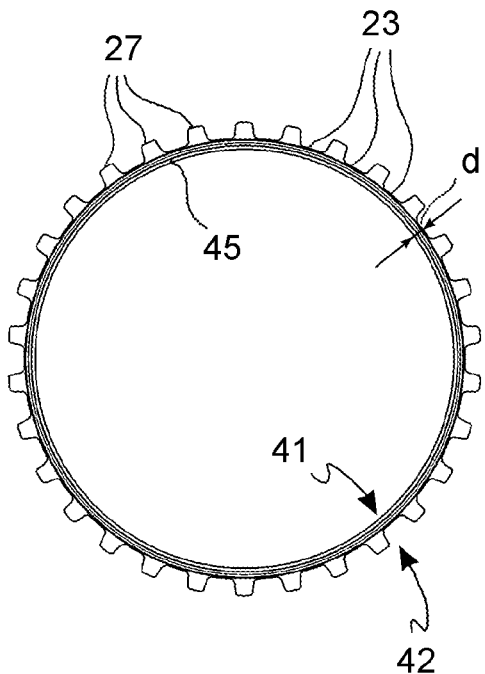
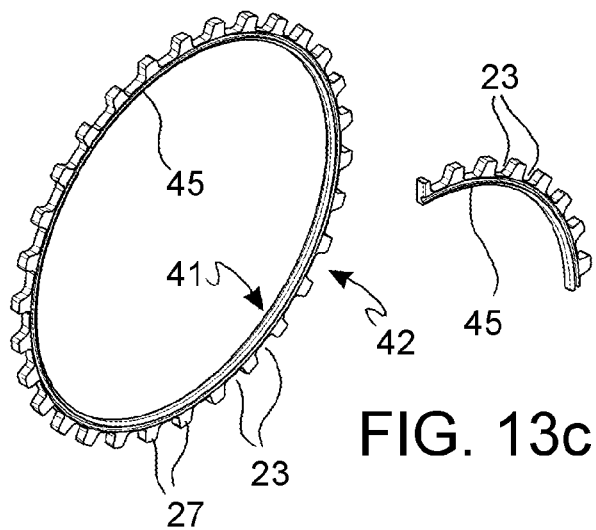
FIG. 13a  FIG. 13b  FIG. 13c
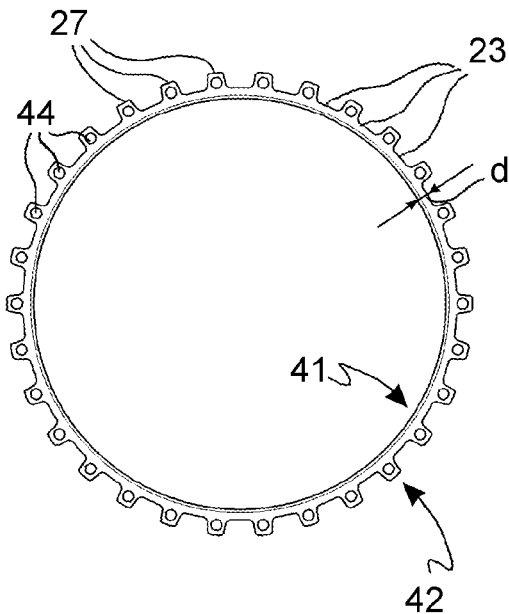
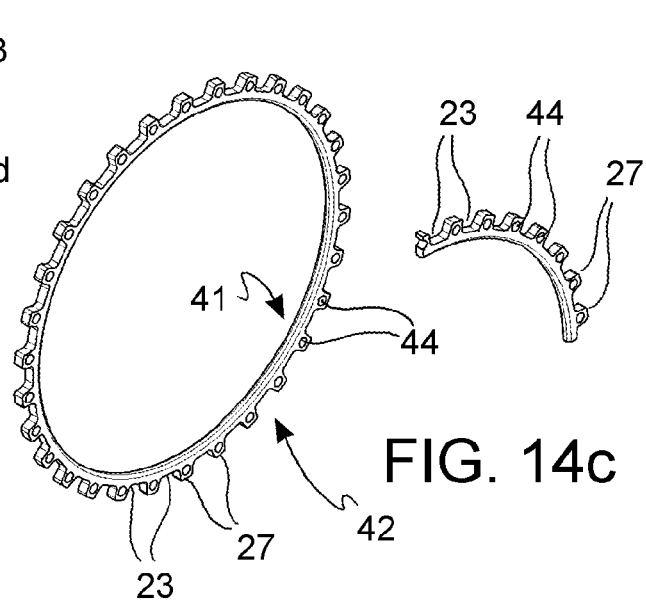
FIG. 14a  FIG. 14b  FIG. 14c

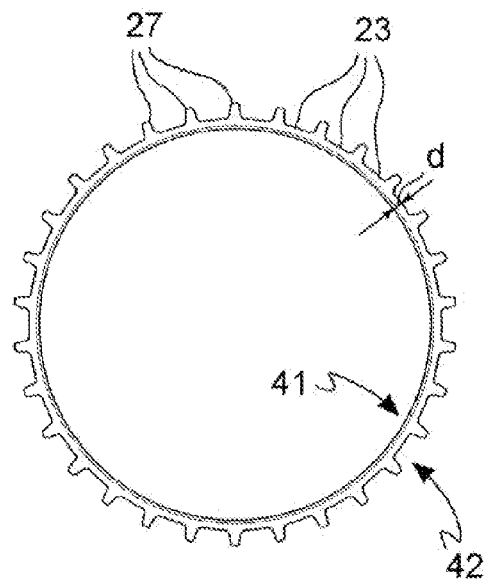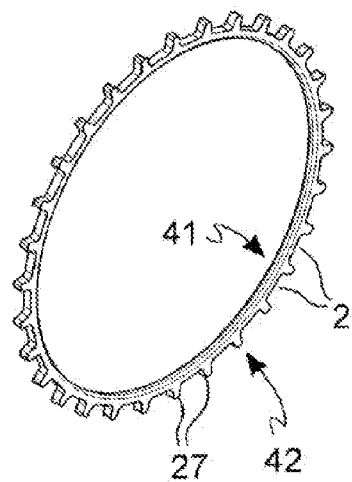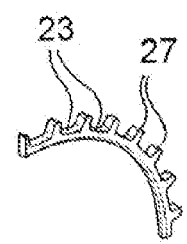
FIG. 17a  FIG. 17b  FIG. 17c
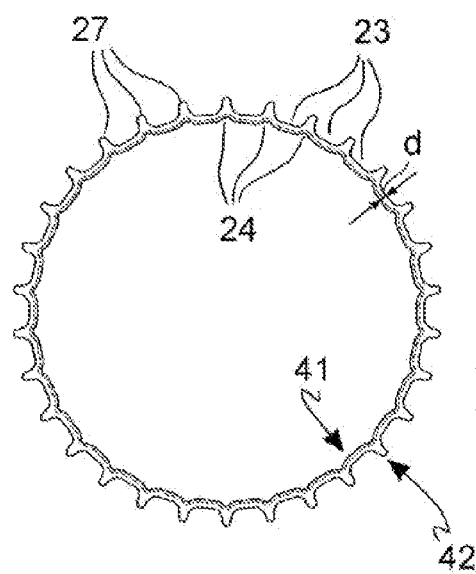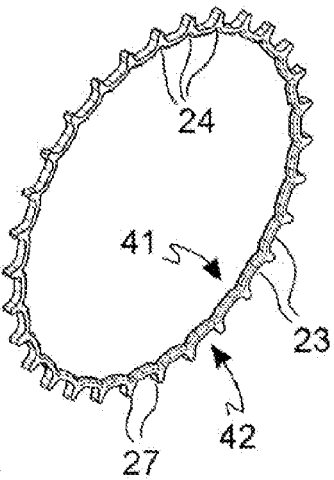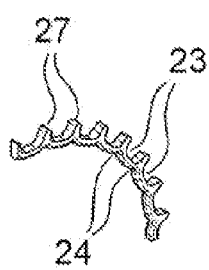
FIG. 18a  FIG. 18b  FIG. 18c

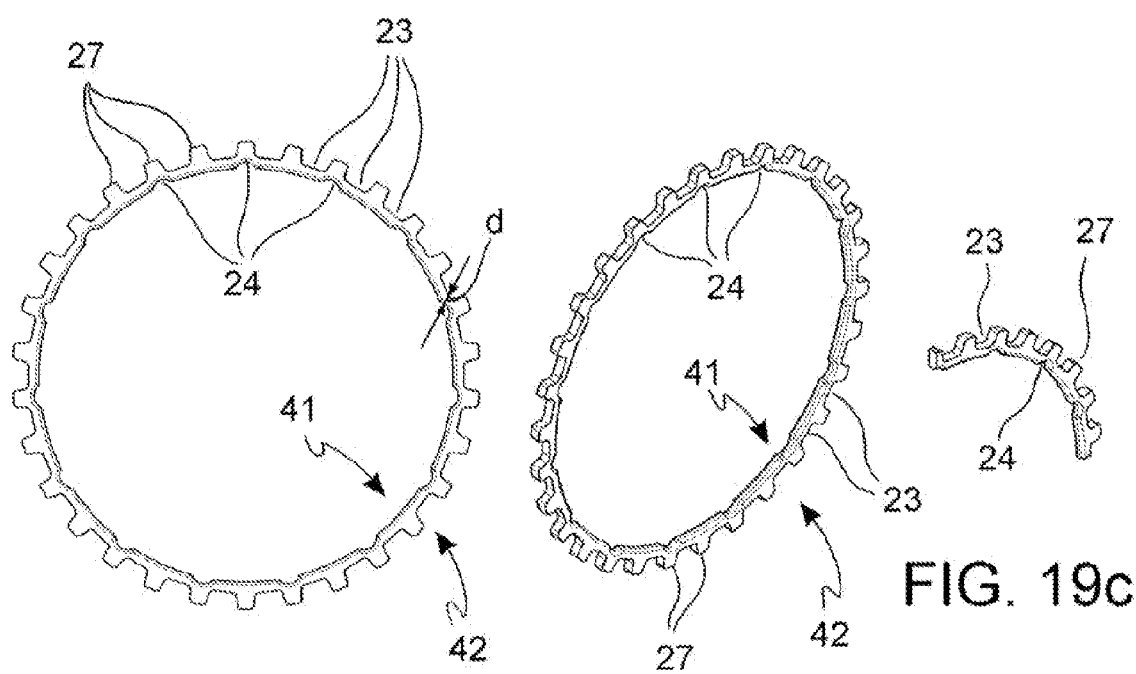

DEVICE FOR RETRACTING A PISTON

CROSS-REFERENCE TO RELATED APPLICATION

This application is the 35 U.S.C. §371 national stage of PCT Application No. PCT/IB2012/055102, entitled "Device for Retracting a Piston" and filed Sep. 25, 2012, which is herein incorporated by reference in its entirety and which also claims priority to, and the benefit of, Italian Application No. MI2011A001739, filed Sep. 27, 2011, which is herein incorporated by reference in its entirety.

The present invention relates to a device for retracting a piston suitable for actuating at least one pad for brake calipers of the type comprising a body arranged astride of a brake disc having a rotation axis and two opposite friction surfaces perpendicular to the rotation axis. The above-mentioned piston is suitable for axially translating, thus bringing each pad in contact with force against a respective friction surface of the disc, generating a braking friction torque that is opposite to the rotation direction of the disc. The above-mentioned piston is slidably actuated within a respective seat formed in the caliper body, biased by the pressure of a brake fluid supplied by a supplying plant, in a manner that is controlled by a user to carry out a braking action.

In other terms, a braking action of a disc brake is carried out by acting on the pressure of the brake fluid, which push the pistons to come out towards the disc, such pistons influencing the pads against the braking surfaces of the disc, converting by friction the kinetic energy of the vehicle into thermal energy, and generating a braking force that hinders the rotation of the disc, and thus the forward motion of the vehicle, by braking the motion thereof.

The device for retracting allows the piston to come back into the respective seat again at the end of the biasing of the pressurized brake fluid, allowing the pads to move away from the friction surfaces of the disc and preventing them from remaining inadvertently in contact with the disc even after the end of the biasing. In fact, this would cause the drawback of the persistence of a residual braking torque, with the adverse effect of an unacceptable reduction in the efficiency of the moving vehicle, and a high, rapid consumption of the pads and the disc.

Furthermore, in the cases of high braking pressures, also the caliper body can elastically deform, opening relative to the friction surfaces of the disc under the action of the reaction of the pushing force against the disc friction surfaces. At the end of such biasing of the brake fluid, the caliper body elastically regains its initial configuration by moving also the piston and the pads closer to the friction surfaces of the disc. In fact, the piston will carry out a total return stroke that is the same as the sum of a first contribution, due to the elastic return of the gasket, and a second contribution due to the elastic return of the caliper body. In such conditions, the pad could remain pressed on the friction surface of the disc even after the end of the brake fluid biasing, with the above-mentioned adverse consequences.

In fact, a problem that has been found in the prior art is that, at the end of a braking action, the piston can remain partially extracted with respect to a rest position thereof in the caliper body, by an amount depending on the deformations of the brake caliper and the components thereof during the braking action.

The amount of the piston return in the caliper body at the end of a braking action will be referred to as "Rollback" in the present specification.

From JP 64-21826 U, JP 09-0606666 A2, JP 10292834, a device for retracting a piston is known, which uses an elastic element, in particular a gasket acting on the piston.

Such gasket is received in an annular seat in the cylinder surface, and acts with force on the piston side surface, elastically deforming in the sliding direction of the piston during the biasing of the pressurized brake fluid, thus accumulating elastic deformation energy. Such energy is then released at the end of the biasing of the brake fluid, the gasket elastically regaining its configuration and pulling the piston within the cylinder.

As the pad wears out, the piston advances towards the outside by an amount that is equal to the amount of wear of the pad, the side, surface of the piston sliding with respect to the gasket. At the end of the biasing, the gasket elastically regains its original shape, drawing the piston back only by an amount that is proportional to the deformation.

Therefore, this known device for retracting a piston has the drawback of an inherent operation variability related to the deformation of the caliper body.

From WO 2010064265 (A1), in the name of the same Owner of the present Application, a further device for retracting a piston is known, which has an elastic element arranged with a radial surface thereof in contact with force against the piston side surface and facing an abutment surface arranged on the opposite side of the elastic element with respect to the brake fluid, and facing a first and a second chambers that are adjacent to the abutment surface, in which such chambers are suitable for housing respective deformed portions of the elastic element under the action of the piston sliding during the braking action, and under the action of the pressure of the brake fluid beyond a fluid pressure threshold corresponding to an elastic deformation of the caliper body.

Although such a device overcomes well positively the problem of compensating for the elastic return of the caliper body for high pressure values, the need is felt to provide a device for retracting a piston that is capable of generating an overall rollback that compensates not only for the elastic deformation of the gasket, but also for that of the whole system, so that, in the absence of a braking action, the pads are returned so as to ensure their release from the disc friction surfaces.

Further characteristics and the advantages of the device according to the invention will be apparent from the description set forth below of preferred implementation examples thereof, given by way of indicative, non-limiting example, with reference to the annexed figures, in which:

FIGS. 9 to 19 represent in side view some embodiments of a ring suitable for defining different retraction degrees of the piston to its seat.

Herein below reference will be made to an "axial direction" to mean a direction coincident with or parallel to the rotation axis of the brake disc; a "hub direction" to mean the side or the direction of a direction facing towards the hub or the inside of a vehicle; a "wheel direction" to mean the side or the direction of a direction facing towards the wheel of a vehicle; a "radial direction" to mean a direction coincident with or parallel to a radial direction of the brake disc; an "extraction" or "forward" or "coming out" to mean the direction of the direction of the path of the piston exiting from its intended seat in the caliper body; to "retraction" or "drawing back" or "return" to mean the direction of the direction of the path of the piston entering its intended seat in the caliper body; to "elastic element" the element acting with pressure or with contact of force on a surface, in particular, but not necessarily, an element to prevent that some matter, for example, a brake fluid, passes from a side to the other one of such element, for example, an element of a synthetic material acting with a planar surface thereof on a sealing surface of a piston for dividing the containment chamber of the pressurized brake fluid from the outside.

Figure 1:
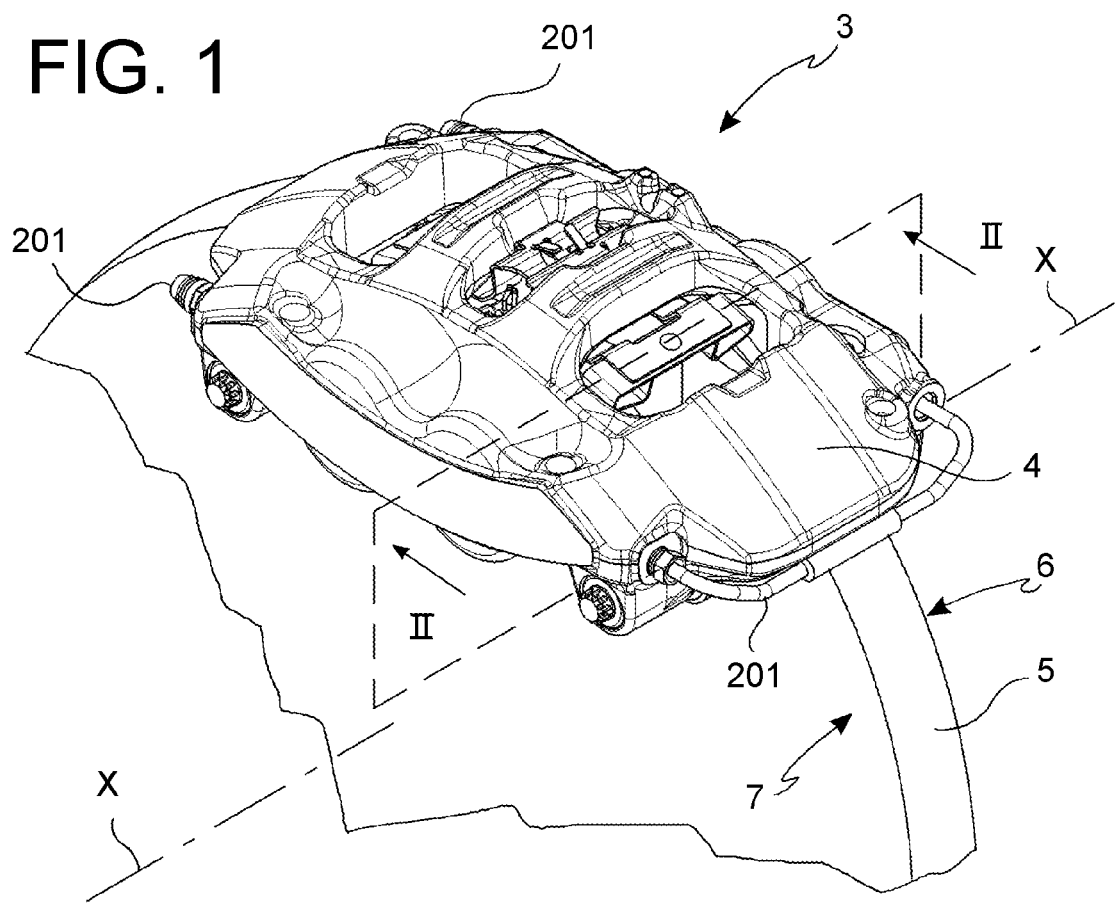
FIG. 1 illustrates in an axonometric view a caliper for a disc brake arranged astride of a brake disc partially in section.
Figure 2:
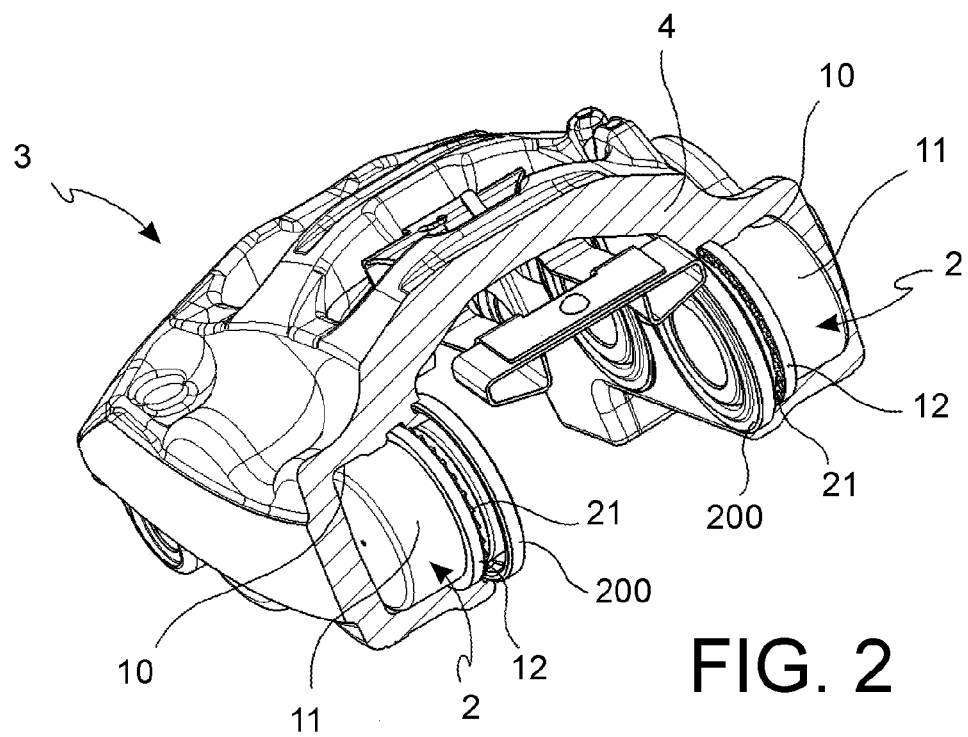
FIG. 2 illustrates in an axonometric view the section along the plane II-II of the caliper of FIG. 1, with pads and the brake disc omitted, highlighting the pushing pistons of the pads, the devices of retracting and the dust caps.
Figure 3:
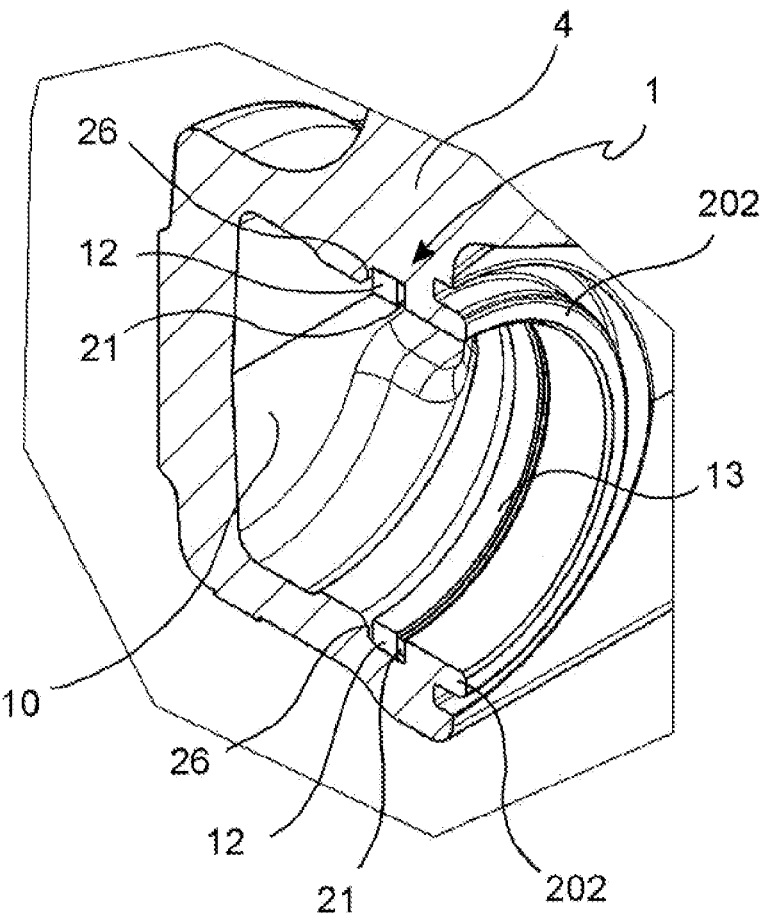
FIG. 3 illustrates in cross-section a detail of the caliper of FIG. 1 relating to a seat for a piston and an annular seat for an elastic body and an elastic ring.

In accordance with a general embodiment, a brake caliper 3 comprises a caliper body 4 arranged astride of a brake disc 5 (FIG. 1). Said disc has a rotation axis X-X and opposite friction surfaces 6, 7, on which braking pads act, that are not shown in the Figures. Said pads are received in said caliper body 4 so as to be able to slide in the axial direction to the brake disc (the direction parallel to the axis X-X) to act respectively on said opposite friction surfaces 6, 7. Said piston is equipped with dust caps 200 secured to a seat provided for in the side surface 11 of the piston and at the port 202 of the seat for the piston 10 provided for in the caliper body 4.

Figure 4:
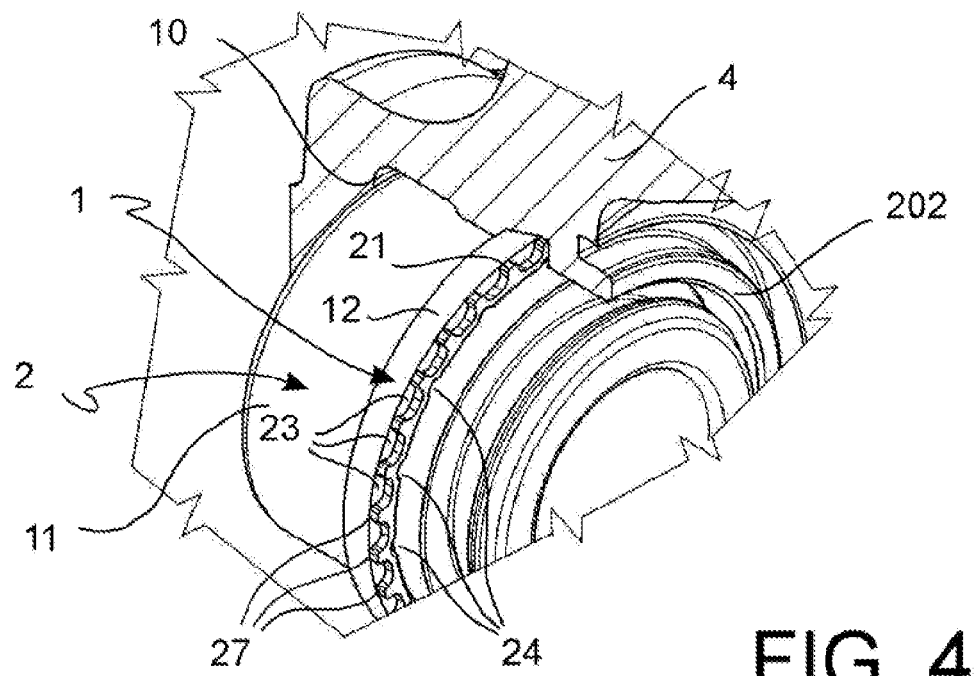
FIG. 4 illustrates the cross-section of FIG. 3, in which, in the seat for a piston, a piston is housed, which lacks the dust cap.

Said caliper body 4 further comprises at least one piston seat 10 suitable for receiving the piston 2 (FIG. 4). Said piston 2 comprises a side surface 11 suitable for sliding in said piston seat 10 so as to be able to be biased by a brake fluid coming out froth said seat to influence at least one of said pads against said friction surfaces of the brake disc.

A chamber is provided between said seat 10 and said piston 2, which is suitable for receiving brake fluid supplied through a brake fluid inlet, not shown in the Figures, which put in fluidic communications, by means of brake fluid ducts 201, said chamber and a fluid supplying and pressure control plant, which pressure is exerted, for example, upon the braking command of the driver of a vehicle on which the braking system comprising the caliper is mounted, or upon the command of a control unit for managing the driving of the vehicle, for example, to correct the vehicle dynamic behaviour.

Said device comprises an annular seat 26 coaxial with the piston seat 10. Such an annular seat comprises an axial abutment surface 40 perpendicular to the axial direction and arranged in the direction of output of the piston, and a radial bottom surface 28 arranged facing the side surface 11 of the piston 2.

Said device comprises at least one elastic element 12 arranged with a first radial surface 13 thereof in contact with force against said piston side surface 11, and with a second radial surface 14 thereof in contact with force against the caliper body 4.

Advantageously, said elastic element 12 is also a sealing member that is in sealing contact against the side surface 11 of the piston and the bottom surface 28 of a slit or annular seat 26 provided for in the caliper body facing the piston 2 seat 10 and suitable for receiving said elastic element 12.

In accordance with an embodiment, said elastic element 12 comprises a third axial surface 15 at the pressurized fluid side, facing away from said pads and suitable for being influenced by the brake fluid.

In accordance with an embodiment, said elastic element 12 comprises a fourth axial surface at the piston exiting side, facing towards the pads.

Advantageously, said elastic element 12 with its fourth surface 16 faces with a portion 17 thereof a first chamber 18 arranged in the proximity of the side surface of the piston and opening towards said piston side surface 11.

Furthermore, the device for retracting comprises at least one elastic ring 21 housed in the annular seat 26 and axially (interposed) arranged between the elastic element 12 and the axial abutment surface 40 on the opposite side to the brake fluid. The ring 21 has an inner perimeter surface 41 and an outer perimeter surface 42.

Advantageously, between the inner perimeter surface 41 and the side surface 11 of the piston 2, the first chamber 18 is formed, having a substantially annular shape and opening towards the piston side surface 11 and towards the elastic element 21. Such first chamber is suitable for housing a deformed portion 100 of the elastic element 12.

The device for retracting further comprises a second chamber 20 facing said outer perimeter surface 42 and arranged between said outer perimeter surface 42 and said radial bottom surface 28 of the seat 26, said second chamber 20 being suitable for allowing the deformation of the ring 21 up to its dilated configuration.

Advantageously, such second chamber 20 is substantially annular and continuous.

In practice, the ring 21, by radially dilating, gradually takes the space contained in this second chamber 20.

Such continuous annular configuration of the second chamber 20 offers an annular interspace having a thickness that varies as the diameter of the ring 21 varies, as the latter deforms.

Thus, the ring 21 is free to be dilated without meeting obstacles.

By virtue of the above-mentioned second chamber 20, the ring 21 can dilate in a sensible manner, thereby making so that the also first chamber sensibly varies its volume, allowing an even sensible deformation of a portion 100 of the elastic element 12.

In accordance with a possible embodiment, for example, the ring is such that the deformation index, defined as the ratio between rigidity of the ring and rigidity of the caliper body with pads, is between 13 and 14.

The chambers 18 and 20 have a variable volume depending on the dilation of the ring 21 and the elastic element 12.

In accordance with an embodiment, the elastic ring further comprises a first and a second base surfaces, on opposite sides of the ring, a first surface 19 of which is in abutment contact with the fourth surface 16 of the elastic element 12.

In accordance with an embodiment, said first base surface 19 defines, with an edge thereof, the port of the first chamber 18, from which the resting elastic element 12 faces towards said first chamber 18. Said base surface 19 is suitable for supporting said elastic element 12 when it is biased by the pressurized fluid.

In accordance with an embodiment, said base surface 19 is radially retracted, so as to be furthest from the side surface 11 of the piston 2 with respect to said first chamber 18, and so as to leave an opening from which said elastic element 12 can face said first chamber 18.

According to an embodiment, the ring 21 has an inner radial dimension R1 and an outer radial dimension R2, in which R1 and R2 respectively define the radiuses of two coaxial cylindrical surface, between which the ring is embedded.

In accordance with an embodiment, said ring 21 has an inner radial dimension R1 that is suitable for leaving a predefined clearance D1 between said ring 21 and said piston side surface 11, so as to form, by resting on the side wall of the annular seat 26 provided for in the body of the caliper 4, said first chamber 18.

Advantageously, said ring 21 is elastically deformable radially, in particular, it is radially dilatable varying between a rest configuration with inner radial dimension R1 and outer radial dimension R2, and a deformed configuration with an inner radial dimension R1' larger than R1 and an outer radius R2', said deformation being caused by a radial component of the biasing exerted on the inner perimeter surface 41 of the ring 21 by the elastic element 12, in the opposite direction with respect to the side surface 11 of the piston 2.

Such biasing exerted by the elastic element 12 can be caused by the movement of output of the piston 2, said first surface 13 of the elastic body being in contact with force on the piston side surface 11, and by the pressure of the brake fluid on the third surface 15 of the elastic element 12, during a braking action.

As a consequence of the progressive dilation of the ring, as the inner radius R1' increases under the action of the radial component of the force exerted by the elastic body 12, also the volume of the chamber 18 increases, therefore also a portion 100 of the elastic body 12 penetrating within the chamber 18 increases.

Thereby, the elastic element 12 is capable of accumulating an elastic energy that is larger than that that it would accumulate, if the ring 21 is not dilated, since the deformed portion 100 is larger. In such conditions, the deformed portion 100 advances with respect to its rest configuration, by a section RB2 that is larger than a section RB1 by which it would advance if the ring is not dilated. At the end of the biasing through the brake fluid pressure, thus at the end of the braking action, the elastic element and the ring 21 tend to return to their rest configuration, passing the accumulated energy and tending to draw the piston back by an overall section RB2, larger than RB1.

Thus, the overall rollback RB2 will be the result of a first contribution due only to the elastic return RB1 of the elastic element 12, and a second contribution due to the elastic return of the ring 21.

In such a manner, the elastic element is capable of compensating in a proportional manner not only for the elastic deformation of the elastic body, but also for the elastic deformation of the caliper body, due to high pressures of the brake fluid.

In other terms, the advance of the piston 2 towards the disc, caused by the pressure of the brake fluid, pulls in the piston forwarding direction a deformed portion 100 of the elastic element 12 by a section RB1. When the piston reaches a point corresponding to the contact with force of the pads on the disc friction surfaces, as the pressure of the fluid increases, also the caliper 3 begins to be deformed and, concurrently, the piston advances by a further section corresponding to the deformation of the caliper, the pads remaining in contact with force against the disc friction surfaces. In such conditions, the overall advance of the piston is RB2. At the end of the action of the brake fluid, the elastic element 12 and the ring 21 return to their initial configuration, pulling the piston back by a section RB2, completely compensating for the overall deformation of the system.

According to an implementation, the ring 21 can be made in a variety of shapes, some examples of which are described in the FIGS. 9 to 19. In particular, the ring 21 comprises lightening means suitable for facilitating the radial deformability of the ring 21 when biased.

For example, such lightening means comprise at least one inner radial recess 24 on the inner perimeter surface 41, said recess being axially open.

In accordance with an embodiment, the ring 21 comprises at least one outer radial recess 23 on the outer perimeter surface 42, said recess being axially open.

In an embodiment, each pair of adjacent inner 24 or outer 23 radial recesses defines an interposed tooth 27.

According to an embodiment, the ring 21 comprises a number of teeth 27 between twenty-six and thirty-six on at least one between said inner and outer perimeter surfaces 41 and 42.

In a possible implementation, the lightening means comprise at least one recess or hole 44 passing axially straight through the ring 21.

In accordance with an embodiment, the lightening means comprise a plurality of recesses or holes 44 passing through axially, each of said through recess or hole being preferably arranged in a respective tooth 27.

According to an implementation, the lightening means comprise at least one circumferential channel 45 made along said ring 21.

In an implementation embodiment, said ring comprises a plurality of said inner recesses 24 and a plurality of said outer recesses 23' equally spaced apart.

In accordance with an implementation embodiment, the inner recesses 24 and said outer recesses 23 are made in an equal number.

According to a possible implementation, the inner recesses 24 and said outer recesses 23 are arranged alternating with one another, said ring 21 in particular having a coil shape, as shown, for example, in FIGS. 12 and 18. Such shape of the ring 21 confers to the ring 21 a high expansibility in the circumferential direction, corresponding to a higher deformability in the radial direction. In fact, the action of the radial component of the biasing of the elastic element 12 on said ring 21, due to the pressure of the brake fluid and the advance of the piston 2, thereby allows considerably widening the volume of the first chamber 18, allowing the penetration of a larger portion 100 of the elastic element 12 in such first chamber 18 and a longer return stroke on the piston 2.

In a possible embodiment, the minimum thickness (d) of the ring at the inner and outer recesses, defined as the chord thickness d, is selected with a value of between 0.5 mm and 3 mm, preferably between 0.6 mm and 2.5 mm, in particular between 0.6 mm and 0.8 mm.

In accordance with an embodiment, the ring 21 can be made of a thermoplastic resin, Teflon®, or a perfluoroalkoxy copolymer PFA.

In accordance with an embodiment, the radial bottom surface 28 of the annular seat comprises an inclined portion 29 so as to reduce the radial dimension of the annular seat 26 on the opposite side to the disc, and a cylindrical portion 30 suitable for defining a part of the second chamber 20, and, in accordance with an embodiment, for receiving said ring 21.

In a possible embodiment, the ring has a bevel between said inner perimeter surface and a base surface of the ring facing towards said elastic element, said bevel being suitable for facilitating the deformation of the elastic element in the direction of output of the piston.

An operational method of the device for retracting the piston is described herein below.

In fact, in accordance with a second aspect of the present invention, the above-mentioned needs are met by a method for actuating a device (1) for retracting a piston (2) for brake caliper (3), said brake caliper comprising a caliper body (4) arranged astride of a brake disc (5) having friction surfaces (6, 7) perpendicular to a rotation axis (X-X) defining an axial direction, and opposite pads received in said caliper body so as to be able to slide in the axial direction to the brake disc to act respectively on said opposite friction surfaces, said caliper body also comprising at least one piston seat (10) suitable for receiving the piston (2) equipped with a side surface (11) suitable for sliding in said piston seat so as to be able to be biased by a brake fluid coming out from said seat to influence at least one of said pads against said friction surfaces of the brake disc.

In more detail, said method comprises a step of influencing a portion of the elastic element on a surface (15) opposite to the direction of output of the piston, through the pressure of the brake fluid.

Furthermore, the present method comprises a step of elastically deforming, in the direction of output of the piston (2), a portion (100) of the elastic element (12) in contact with the side surface (11) of the piston, said portion acting on the ring (21) through a force depending on said pressure of the fluid and being suitable for being decomposed into a radial component and an axial component, said elastic element (12) accumulating a first amount of elastic deformation energy The method comprises a further step of elastically dilating the ring (21) in the radial direction towards the outside through said radial component of said force, accumulating a second amount of elastic deformation energy.

In an implementation, the above-mentioned method comprises a step of removing the pressure of the brake fluid, allowing the elastic return of the ring (21), said ring (21) releasing said second amount of elastic deformation energy acting inwardly in the radial direction on said deformed portion (100) of the elastic element, said elastic element (12) partially drawing back and axially pulling the piston (2) along a first roll-back section, and, furthermore, allowing the elastic return of the deformed portion (100) of the elastic element (12), said elastic element (12) releasing said first amount of elastic deformation energy axially pulling the piston (2) along a second section of rollback.

In other terms, the first radial surface (13) of the elastic element (12) is arranged in contact with the piston (2) so that it is pulled by the movement of the piston coming out from its seat of the caliper body, elastically deforming a portion (100) of the elastic element (12) in the first chamber (18) and pushing said elastic element against the first base surface (19) of the elastic ring (21).

When the piston (2) reaches an end stroke point when it comes out, following the contact with force between pads and the disc, as the braking action continues and as the pressure of the brake fluid increase, the elastic body continues to be deformed, thus occupying the first chamber 18 and exerting an increasing force against the elastic ring (21).

Such a force can be decomposed, for example, along an axial component and a radial component. The radial component of the force acts on the inner perimeter surface (41) of the elastic ring, in the radial direction towards the outside, tending to elastically widen it. Thus, also the ring (21) elastically deforms. In such a manner, the portion (100) accumulates a first amount of elastic deformation energy, and the elastic ring (21) accumulates a second amount of elastic deformation energy. As the pressure of the brake fluid increases, also the caliper (3), the pads, and the piston are elastically deformed, and the stroke of output of the piston depends on the sum of the contributions given by the individual deformations.

As the action of the brake fluid stops, the ring (21) tends to return in its rest configuration while shrinking and gradually releasing the second amount of elastic energy accumulated before, when the brake fluid was pressurized. During such return step of the elastic ring, it acts on the portion (100) through a radial component of force facing inwardly, forcing the elastic element (12) to partially draw back, thus pulling the piston along a first section of rollback.

The elastic element (12) also, as it draws back, releases the first amount of elastic deformation energy axially accumulated before, pulling the piston along a second section of rollback.

In this way, the total rollback is given by the sum of the first and the second contributions, therefore the return of the piston is higher than that for the return only of the elastic element, but it accounts and compensates for the deformation of the whole system.

Some exemplary methods of adjusting the retraction of a piston are described herein below.

By selecting a ring 21 with a predefined deformation index and a predefined inner radius R1 between its inner perimeter surface 41 and the side surface 11 of the piston, it is possible to define the amount of the first chamber 18 suitable for receiving the elastic deformation of the elastic element pulled by the relative movement of the piston coming out from its seat, therefore the amount of the return that the elastic element, by its first surface 13 of contact with force between the elastic element and the piston, will impose to the piston, when the braking action stops, as a first retracting stroke of the piston.

By selecting a ring 21 with a predefined number and dimension of the outer recesses 23 and the inner recesses 24, it is possible to define:

the minimum pressure threshold of the brake fluid that determinates a sensible deformation of the elastic ring proportional to the threshold of sensible elastic deformation of the caliper body that it is desired to Compensate for;

the amount of the drawing back that, when the braking action stops, will be imposed through the elastic return of the elastic element and the ring, which also accounts for the deformation of the caliper body.

By virtue of what has been set forth above, it is possible to understand how it is particularly easy to adjust a brake caliper so that is has a desired roll-back also in very different operative conditions. It will be even possible to adjust differently also different devices that are present in the same caliper or in the calipers of a same motor vehicle, in order to obtain a more efficient behaviour of the whole braking system.

Figure 5:
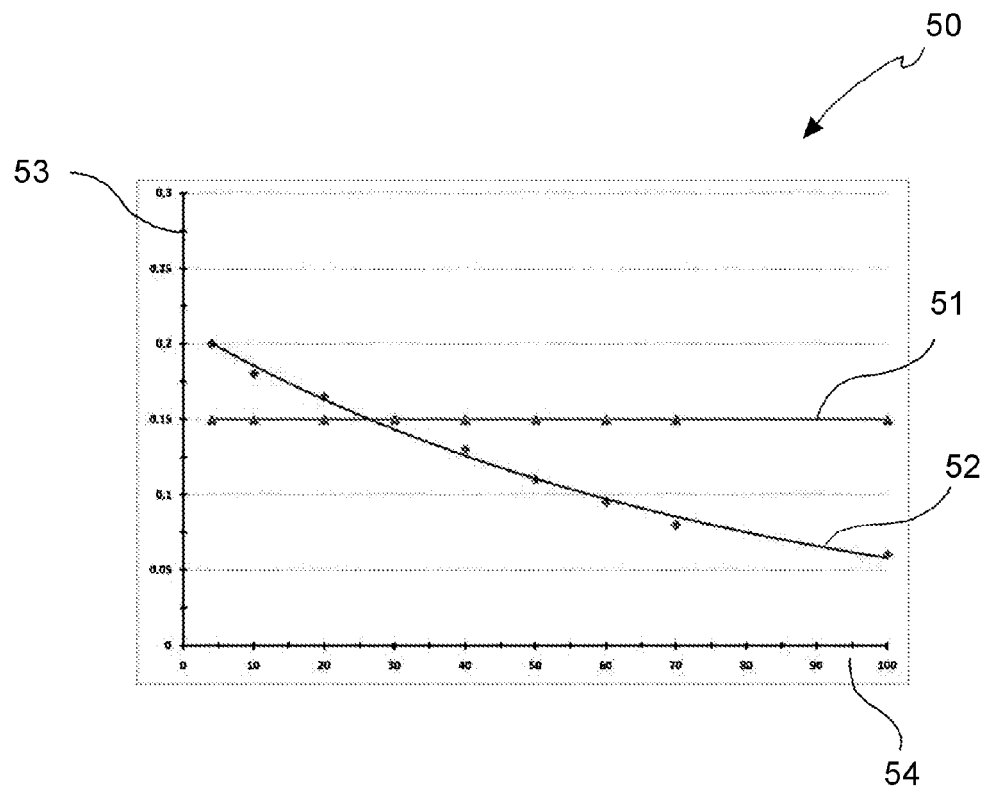
FIG. 5 shows a comparison between a real trend of the rollback without a device according to the invention, and an ideal trend (constant rollback as the pressure of the brake fluid varies).
Figure 6:
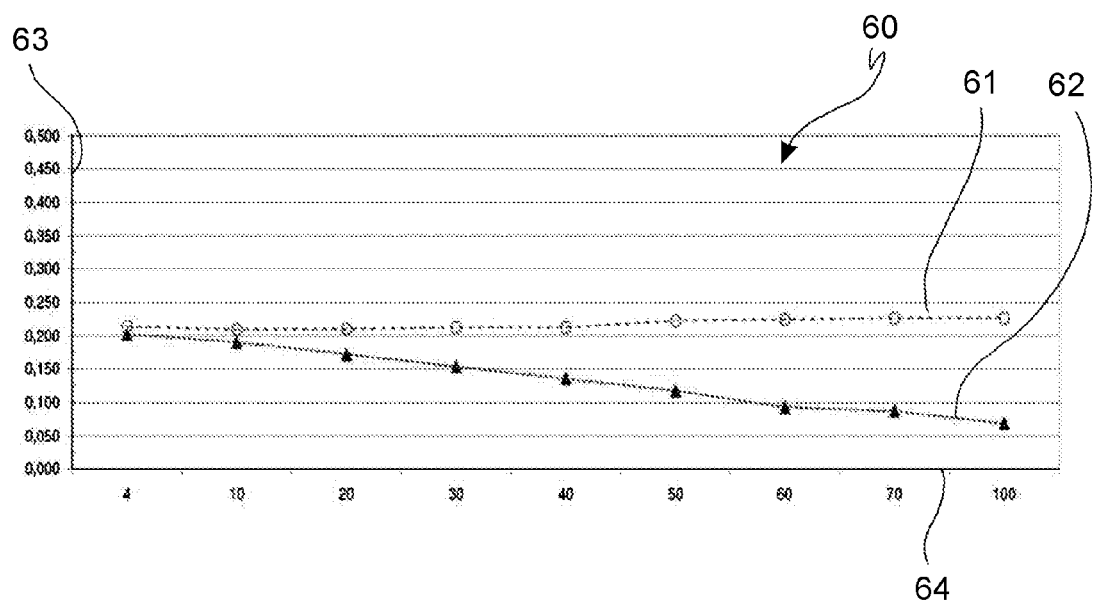
FIG. 6 shows a comparison between a real progress of rollback without a device according to the invention, and a measured real progress of rollback with the device of the invention.
Figure 7:
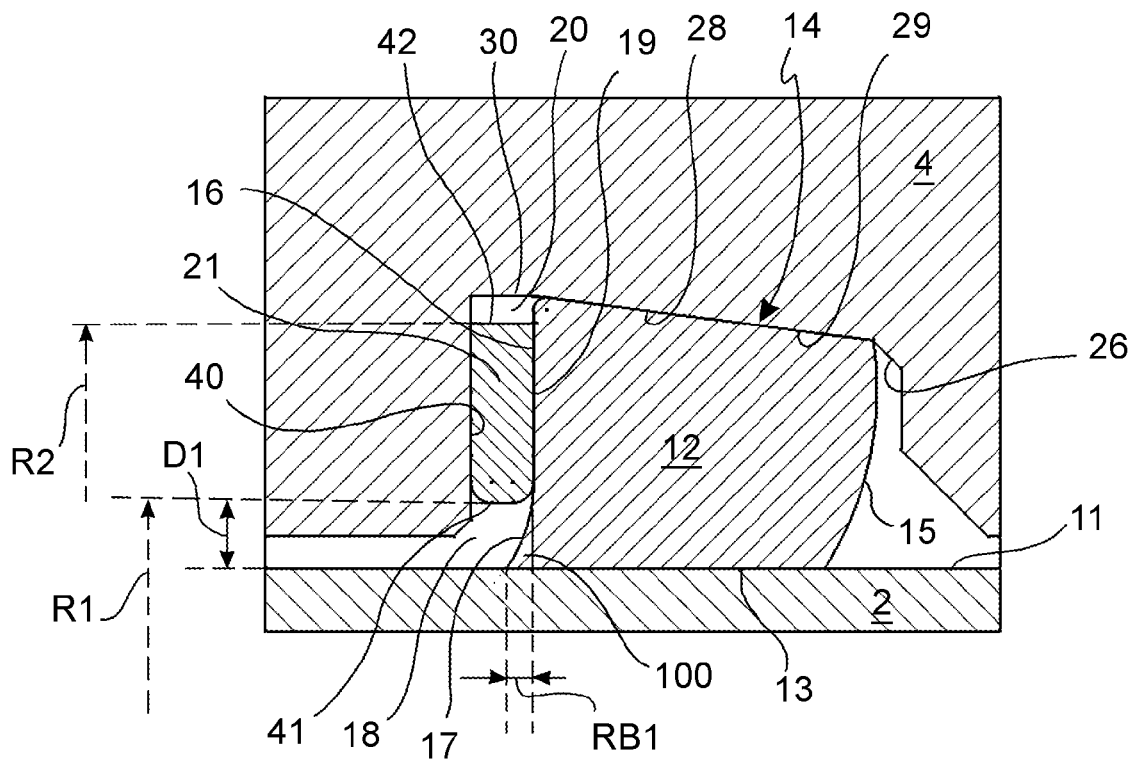
FIG. 7 illustrates in section a detail of the device for retracting according to the invention, in which the elastic element is deformed by the action of the output motion of the piston, while the elastic ring is not sensibly deformed.
Figure 8:
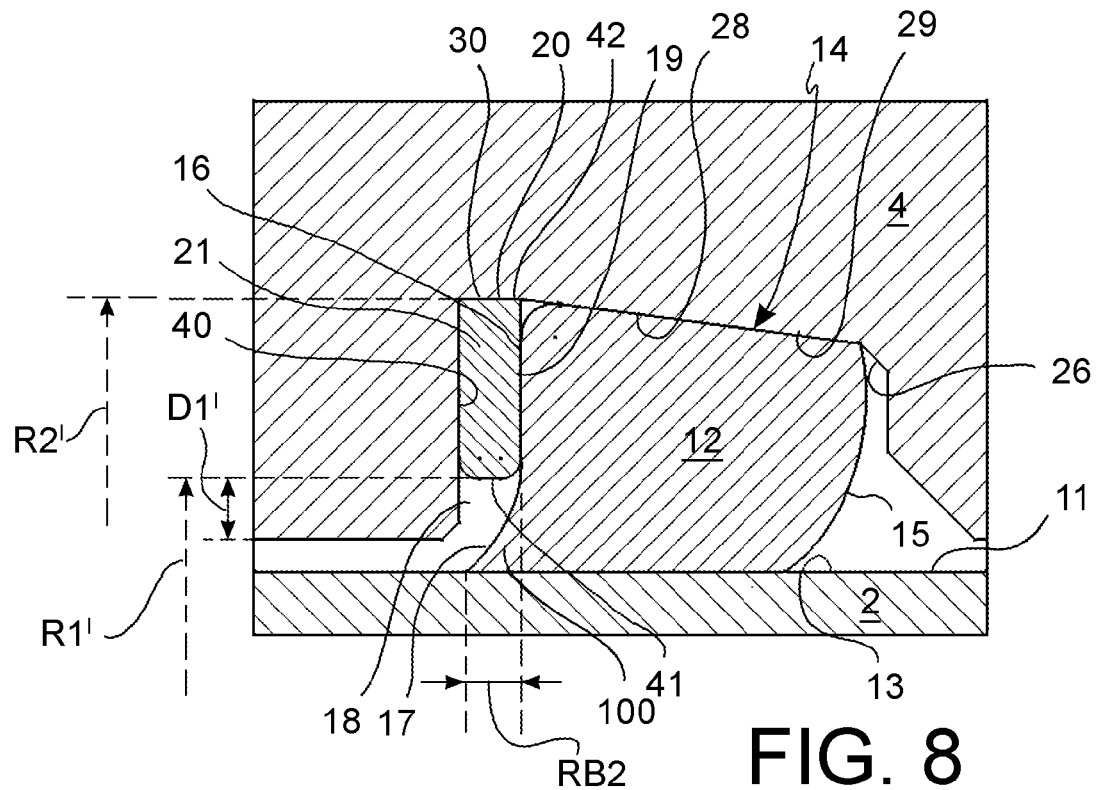
FIG. 8 shows in section the detail of FIG. 7, in which the elastic element pushes the elastic ring until being dilated at the utmost.
Figures 9A, 9B, 9C:
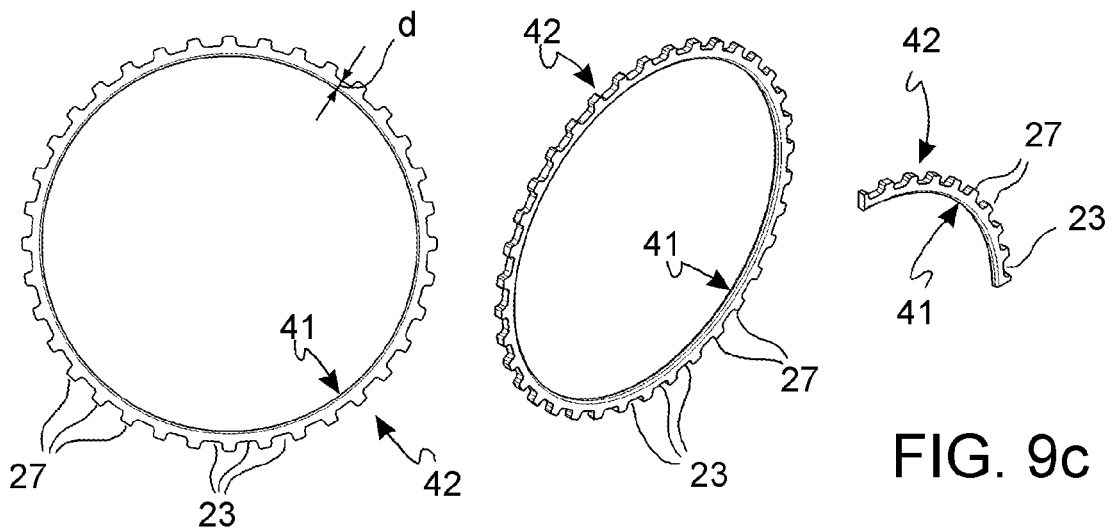
Figures 10A, 10B, 10C:
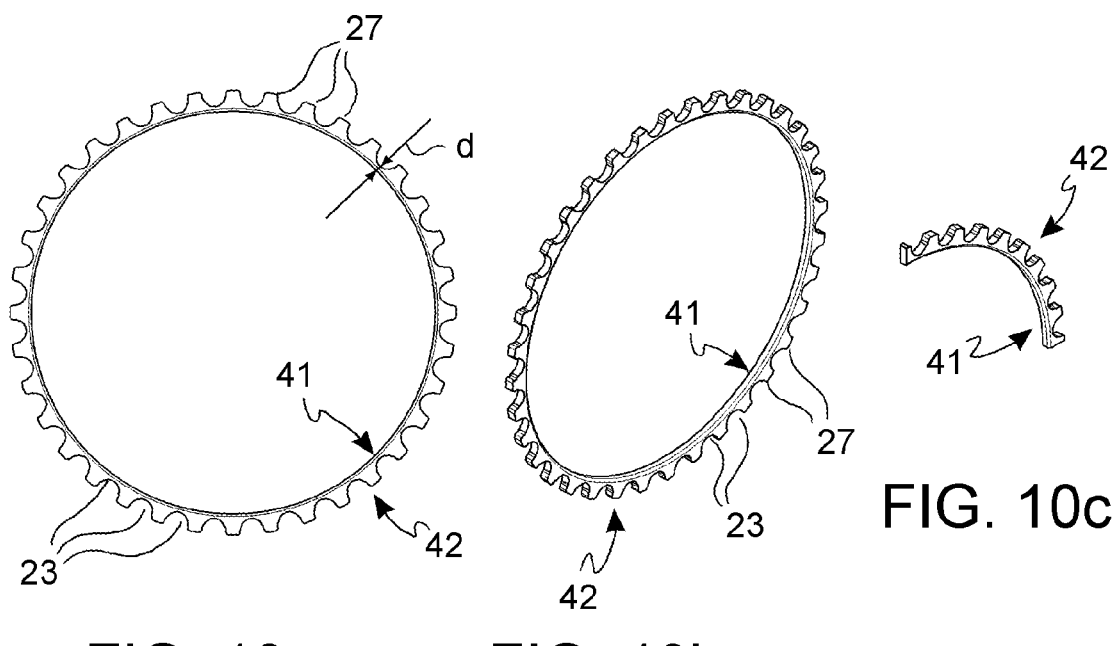
Figures 15A, 15B, 15C:
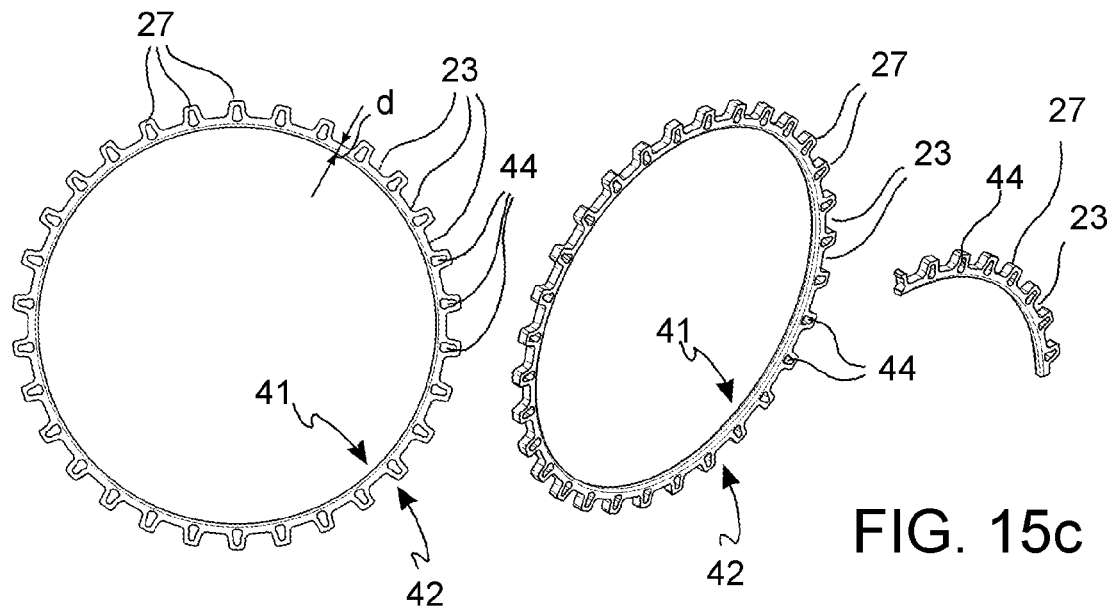
Figures 16A, 16B, 16C:
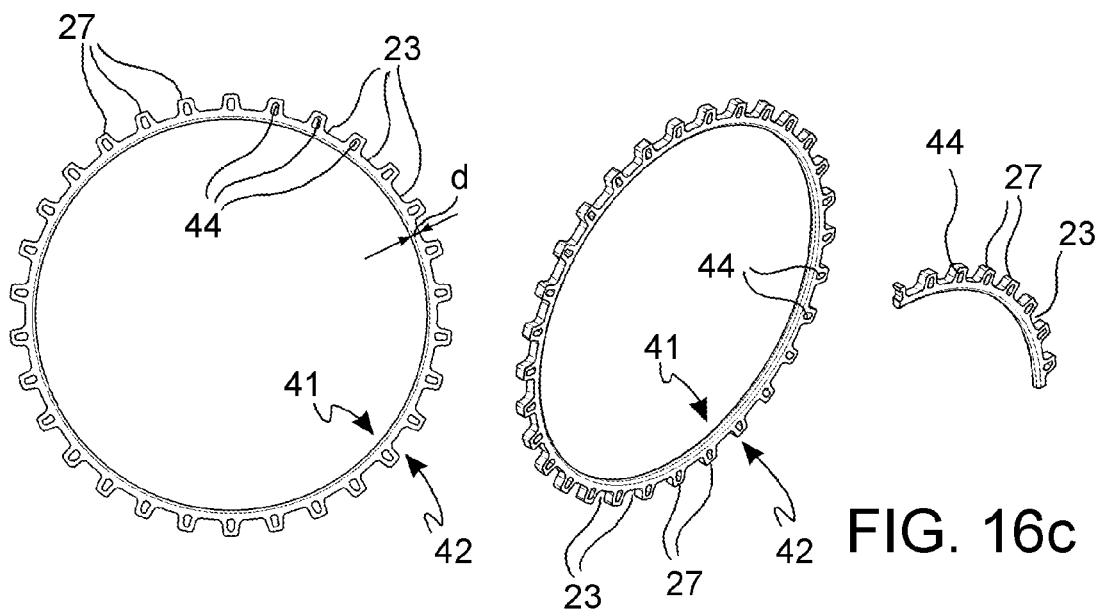

FIGS. 5 and 6 show the comparison between different retraction behaviours based on the invention compared to the prior art.

In particular, they show in the ordinates (53 and 63) the return of the piston in mm, and in the abscissas (54 and 64) the pressure of the brake fluid.

In FIG. 5, the progress 52 of the piston return, measured by means of the final position of the piston with respect to the caliper body, is compared to the ideal progress 51. In such a case, the device does not use a ring 21.

Instead, FIG. 6 shows the comparison between the progress 62 of the piston return without a ring 21 and the progress 61 of the piston return with an elastic ring 21. It is seen that, in the case of using a ring 21 according to the invention, a progress similar to the ideal one 51 of FIG. 5 is obtained.

To the above-described preferred implementation solution of the device, one person skilled in the art, with the aim of meeting specific, contingent needs, will be able to made a number of modifications, adaptations, and replacements of elements with other functionally equivalent ones, without for this departing from the scope of the following claims.

We claim:

1. Device for retracting a piston for a brake caliper, said brake caliper comprising a caliper body arranged astride of a brake disc having friction surfaces perpendicular to a rotation axis defining an axial direction, and opposite pads received in said caliper body so as to be able to slide in the axial direction to the brake disc to act respectively on said opposite friction surfaces, said caliper body also comprising at least one piston seat suitable for receiving the piston equipped with a side surface suitable for sliding in said piston seat so as to be able to be biased by a brake fluid coming out from said seat to influence at least one of said pads against said friction surfaces of the brake disc, wherein said device comprises:
    an annular seat coaxial with said piston seat, said annular seat having an axial abutment surface perpendicular to said axial direction and arranged in the direction of output of the piston, and a radial bottom surface arranged facing said side surface of the piston;
    at least one elastic element arranged in said annular seat, with a first radial surface thereof in contact with force against said side surface of the piston and with a second radial surface thereof in contact with force against said radial bottom surface of the annular seat;
    at least one elastic ring housed in said annular seat and axially (interposed) arranged between said at least one elastic element and said axial abutment surface, on the opposite side to the brake fluid, said ring having an inner perimeter surface and an outer perimeter surface, between said inner perimeter surface and said side surface of the piston forming a first annular chamber open towards the side surface of the piston and towards the elastic element;
    a second chamber facing said outer perimeter surface and arranged between said outer perimeter surface and a portion of said radial bottom surface of the seat, characterized in that
    said ring being radially elastically deformable varying between a rest configuration and a dilated configuration, and wherein
    said second chamber is suitable for allowing the deformation of the ring up to its dilated configuration,
    said second chamber is substantially continuous and annular,
    wherein said ring comprises lightening means suitable for facilitating the radial deformation of the ring when biased and said lightening means are alternatively selected from the group consisting of:
    said lightening means comprise a plurality of recesses or holes passing through axially, each said through recess or hole being arranged in a respective tooth or
    said lightening means comprise at least one circumferential channel made along said ring or
    said lightening means comprise at least one axially open inner radial recess or
    said ring comprises a plurality of inner recesses and a plurality of outer recesses or
    said ring has a radial thickness of between 0.6 and 0.8 mm.

2. Device for retracting, according to claim 1, wherein said ring is selected so that a deformation index, as a ratio between rigidity of the ring and rigidity of the caliper body with pads, is between 13 and 14.

3. Device for retracting, according to claim 1, wherein said lightening means comprise at least one axially open inner radial recess or at least one axially open outer radial recess.

4. Device for retracting, according to claim 1, wherein each pair of adjacent inner or outer radial recesses defines an interposed tooth.

5. Device for retracting, according to claim 1, wherein said lightening means comprise at least one recess or hole passing axially straight through the elastic ring.

6. Device for retracting, according to claim 1, wherein said lightening means comprise a plurality of recesses or holes passing through axially, each said through recess or hole being arranged in a respective tooth.

7. Device for retracting, according to claim 1, wherein said lightening means comprise at least one circumferential channel made along said ring.

8. Device for retracting, according to claim 3, wherein said ring comprises a plurality of said inner recesses and a plurality of said outer recesses equally spaced apart.

9. Device for retracting, according to claim 8, wherein said inner recesses and said outer recesses are made in equal number or wherein said inner recesses and said outer recesses are arranged alternating with one another, said ring having a coil shape.

10. Device for retracting, according to claim 1, wherein said ring comprises thermoplastic resin, or polytetrafluoroethylene (PTFE), or a perfluoroalkoxy copolymer PFA.

11. Device for retracting, according to claim 1, wherein said ring has a minimum radial thickness of between 0.6 and 0.8 mm.

12. Device for retracting, according to claim 1, wherein said ring has a bevel between said inner perimeter surface and a base surface of the ring facing towards said elastic element, said bevel being suitable for facilitating the deformation of the elastic element in the direction of output of the piston.

13. Method for retracting a piston for a brake caliper by means of a device for drawing back a piston for a brake caliper according to claim 1, comprising the steps of: influencing a portion of the elastic element on a third axial surface opposite to the direction of output of the piston, through the pressure of the brake fluid; elastically deforming, in the direction of output of the piston, a portion of the elastic element in contact with side surface of the piston, said portion acting on the ring through a force depending on said deformation of the portion and on the pressure of the fluid and said force being suitable for being decomposed into a radial component and an axial component, said elastic element accumulating a first amount of elastic deformation energy; elastically dilating the ring in the radial direction towards the outside through said radial component of said force, accumulating a second amount of elastic deformation energy.

14. Method for retracting a piston for a brake caliper, according to claim 13, comprising the steps of: removing the pressure of the brake fluid; allowing the elastic return of the ring, said ring releasing said second amount of elastic deformation energy acting inwardly in the radial direction on said deformed portion of the elastic element, said elastic element partially drawing back and axially pulling the piston along a first roll-back section; allowing the elastic return of the deformed portion of the elastic element, said elastic element releasing said first amount of elastic deformation energy pulling the piston axially along a second roll-back section.

* * * * *